(12) United States Patent
Freese, V (10) Patent No.: US 9,766,149 B2
(45) Date of Patent: Sep. 19, 2017

(54) REMOTE SENSOR DATA FOR VEHICLES

(71) Applicant: GM GLOBAL TECHNOLOGY OPERATIONS LLC, Detroit, MI (US)

(72) Inventor: Charles E. Freese, V, Ira Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/669,993

(22) Filed: Mar. 26, 2015

(65) Prior Publication Data
US 2016/0282860 A1   Sep. 29, 2016

(51) Int. Cl.
| | | |
|---|---|---|
| G05D 1/00 | (2006.01) | |
| B60K 35/00 | (2006.01) | |
| F02D 41/28 | (2006.01) | |
| G01K 1/00 | (2006.01) | |
| G01L 23/22 | (2006.01) | |
| G01L 19/08 | (2006.01) | |
| F02D 41/26 | (2006.01) | |

(52) U.S. Cl.
CPC .............. *G01L 23/22* (2013.01); *B60K 35/00* (2013.01); *G01L 19/086* (2013.01); *B60K 2350/92* (2013.01); *F02D 41/266* (2013.01); *F02D 41/28* (2013.01); *F02D 2041/281* (2013.01); *F02D 2200/0414* (2013.01); *F02D 2200/0418* (2013.01); *F02D 2200/703* (2013.01)

(58) Field of Classification Search
CPC . G05D 1/0011; F02D 41/28; F02D 2041/281; F02D 41/266; F02D 2200/0414; F02D 2200/0418; F02D 2200/703; G01K 1/00; G01L 23/22; G01L 19/086; B60K 35/00; B60K 2350/92
USPC .............................................................. 701/2
See application file for complete search history.

(56) References Cited

U.S. PATENT DOCUMENTS

| | | | |
|---|---|---|---|
| 6,564,127 B1 | 5/2003 | Bauerle et al. | |
| 2009/0316671 A1* | 12/2009 | Rolf .................. | H04W 4/02 370/338 |
| 2010/0004862 A1* | 1/2010 | Gentles .................. | G01W 1/17 702/3 |
| 2012/0158207 A1* | 6/2012 | MacNeille .............. | G01W 1/00 701/1 |

* cited by examiner

*Primary Examiner* — Brian P Sweeney
(74) *Attorney, Agent, or Firm* — Lorenz & Kopf, LLP (57) ABSTRACT

Methods and systems are provided for using remote sensor data for a vehicle. The vehicle includes a control system, an interface, and a processor. The interface is configured to automatically obtain one or more remote sensor values via a wireless network from a remote source that is remote from the vehicle. The processor is coupled to the control system and the interface, and is configured to control one or more functions of the control system using the one or more remote sensor values.

19 Claims, 5 Drawing Sheets

REMOTE SENSOR DATA FOR VEHICLES

TECHNICAL FIELD

The present disclosure generally relates to the field of vehicles and, more specifically, to methods and systems for utilizing remote sensor data for vehicles.

BACKGROUND

Vehicles today typically have various sensors that provide measured values of parameters for or pertaining to the vehicle, its components, and/or the environment surrounding the vehicle. For example, many vehicles today have onboard sensors that are used to measure values of, or preliminary values that are used to calculate values of, parameters such as ambient temperature, humidity, and barometric pressure for the environment surrounding the vehicle.

However, such sensors may not always provide optimal information in all situations. By way of example, for certain types of parameters, existing techniques may provide values for certain parameters (e.g. barometric pressure) only at ignition key-on, for example because the operation of the vehicle could thereafter interfere with the obtained values subsequently during the vehicle ignition cycle. By way of further example, existing technologies may not always provide redundancy for the parameter values, and/or may involve the use of sensors onboard the vehicle that may be costly and/or consume weight and space on the vehicle.

Accordingly, it is desirable to provide improved methods and systems for using remote sensor data for vehicles. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises automatically obtaining, via an interface onboard a vehicle, one or more remote sensor values via a wireless network from a remote source that is remote from the vehicle; and controlling, via a processor, one or more functions of the vehicle using the one or more remote sensor values.

In accordance with another exemplary embodiment, a system is provided. The system comprises an interface and a processor. The interface is disposed onboard a vehicle, and is configured to automatically obtain one or more remote sensor values via a wireless network from a remote source that is remote from the vehicle. The processor is coupled to the interface, and is configured to control one or more functions of the vehicle using the one or more remote sensor values.

In accordance with another exemplary embodiment, a vehicle is provided. The vehicle includes a control system, an interface, and a processor. The interface is configured to automatically obtain one or more remote sensor values via a wireless network from a remote source that is remote from the vehicle. The processor is coupled to the control system and the interface, and is configured to control one or more functions of the control system using the one or more remote sensor values.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
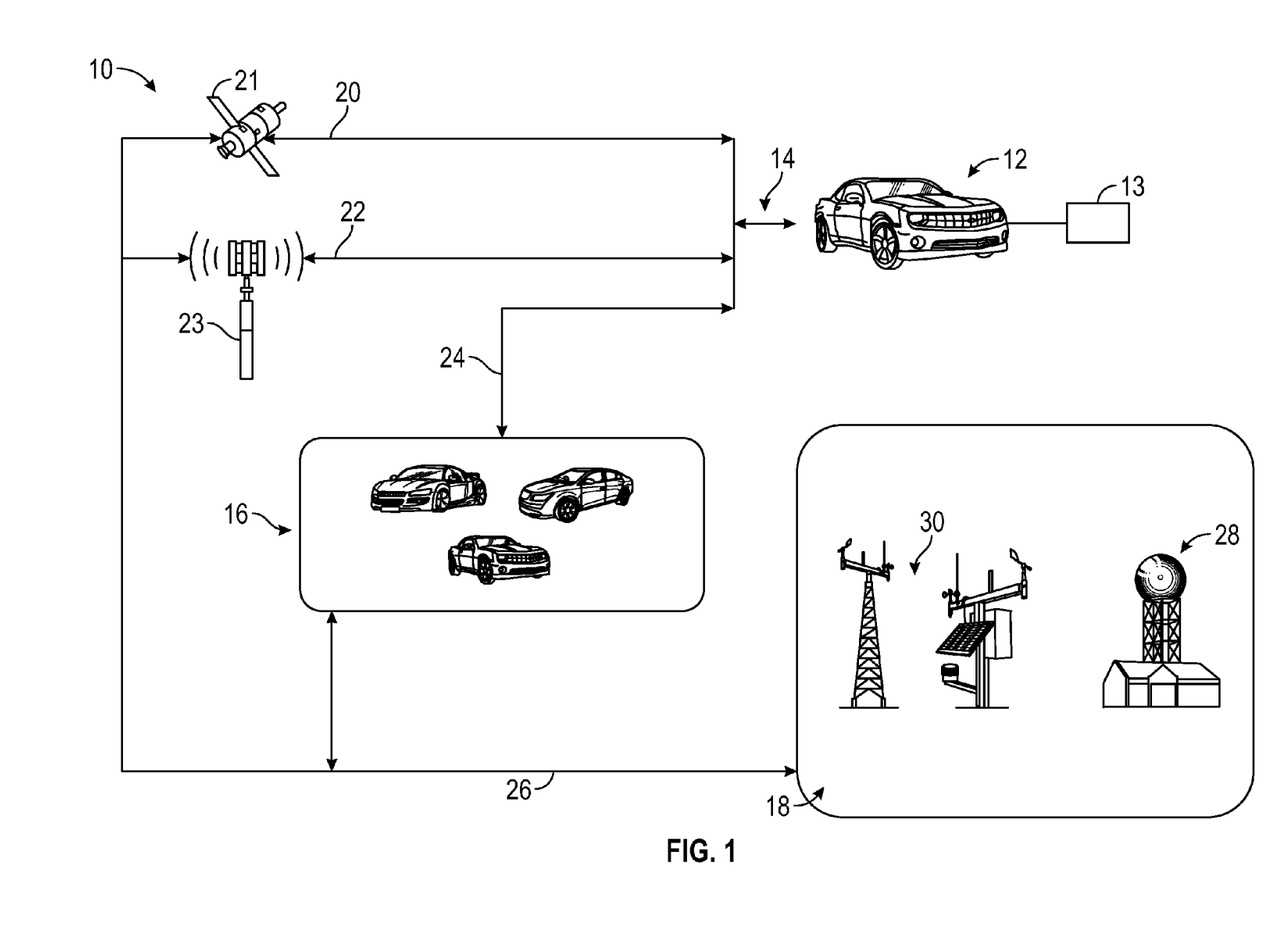
FIG. 1 is a functional block diagram of a system that includes a vehicle having a control system for using remote sensor data, in accordance with an exemplary embodiment.

FIG. 1 is a functional block diagram of a system 10 that includes a vehicle 12. As depicted in FIG. 1, the vehicle 12 includes a control system 13 that controls use of remote sensor data, as described further below in connection with FIGS. 2-5. Also as depicted in FIG. 1, the vehicle 12 communicates via one or more wireless networks 14 for obtaining the remote sensor data from other vehicles 16 on the road and/or from other data sources 18 (e.g., a national weather service 28 and/or local weather stations 30). In one embodiment, the wireless networks 14 include one or more satellite networks 20, cellular networks 22, and/or vehicle to vehicle networks 24 (e.g. using radio frequencies).

In certain embodiments, the satellite networks 20 utilize satellites 21 for communications with the vehicle 12. In certain examples, the one or more satellite networks 20 may be part of one or more global positioning system (GPS) devices, for example for a navigation system of the vehicle 12. In certain embodiments, the satellite network(s) 20 may provide a direct communication between the vehicle 12 and data sources, such as the other vehicles, national weather service 28, local weather stations 30, and/or other data sources. In other embodiments, the satellite network(s) may provide access to a communication network (e.g., the Internet) by which the vehicle 12 can communicate with such data sources.

In certain embodiments, the cellular networks 22 comprise one or more cellular telephone networks. According to an example, wireless network 14 includes one or more cell towers 23 and/or mobile switching centers (MSCs). As appreciated by those skilled in the art, various cell tower/base station/MSC arrangements are possible and could be used with the cellular networks 22. For example, a base station and a cell tower could be co-located at the same site or they could be remotely located, and a single base station could be coupled to various cell towers or various base stations could be coupled with a single MSC, to list but a few of the possible arrangements. In certain embodiments, the cellular network(s) 22 may provide a direct communication between the vehicle 12 and data sources, such as the other vehicles, national weather service 28, local weather stations 30, and/or other data sources. In other embodiments, the cellular network(s) 22 may provide access to a communication network (e.g., the Internet) by which the vehicle 12 can communicate with such data sources.

In certain embodiments, the vehicle to vehicle networks 24 allow for direct communication between the vehicle 12 and the other vehicles 16 with respect to remote sensor data, for example via a radio communications network. In certain other embodiments, the vehicle to vehicle networks 24 may comprise one or more other types of networks, such as, by way of example, Internet communications between the vehicle 12 and the other vehicles 16.

Figure 2:
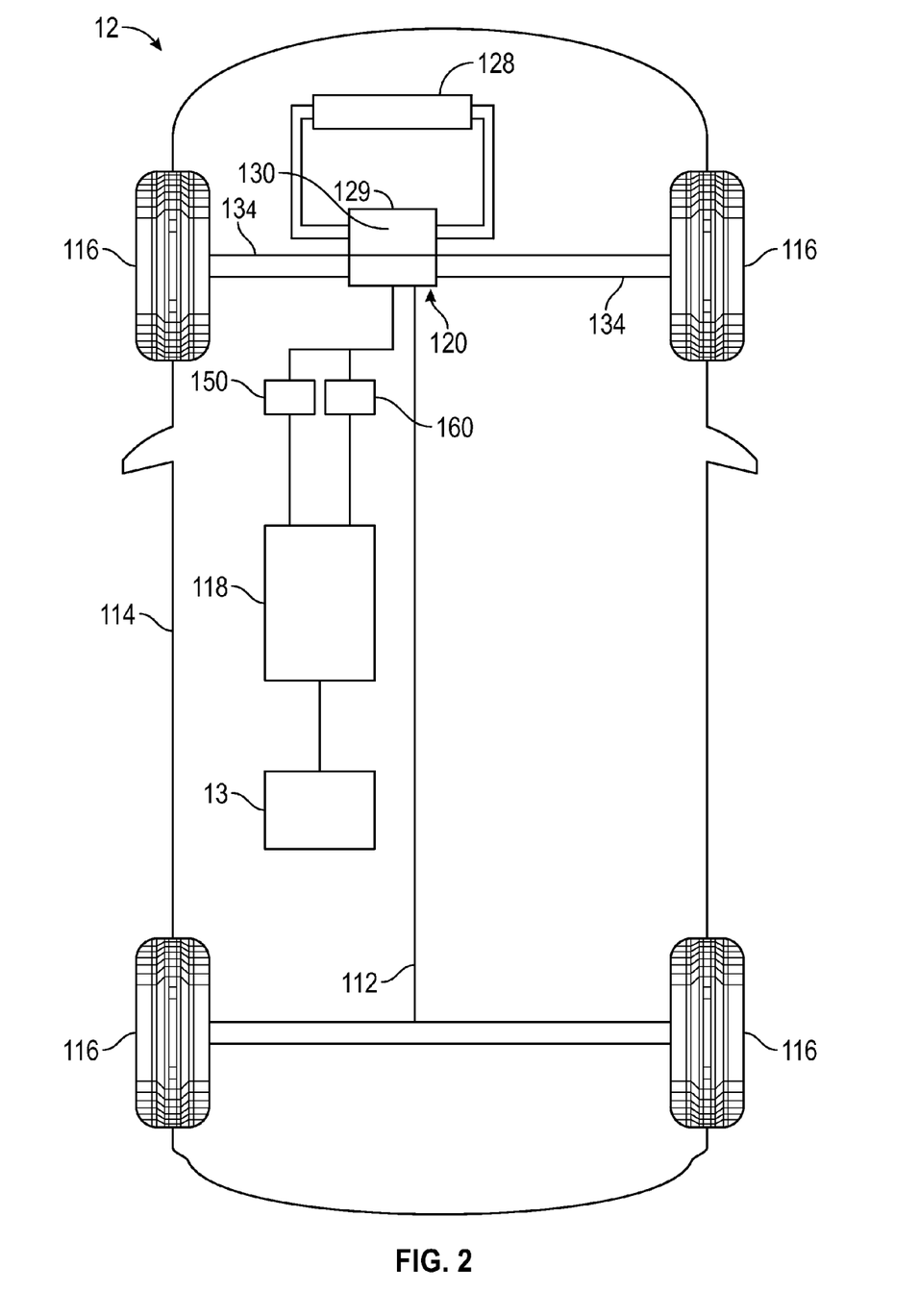
FIG. 2 is a functional block diagram of a vehicle that can be used in connection with the system of FIG. 1, in accordance with an exemplary embodiment.

FIG. 2 provides a functional block diagram of the vehicle 12 of FIG. 1, in accordance with an exemplary embodiment. As described in greater detail further below, the vehicle 12 includes a control system 13 that provides for use of remote sensor data, in accordance with the steps of the process 400 described further below in connection with FIGS. 4 and 5.

As depicted in FIG. 2, the vehicle 12 includes a chassis 112, a body 114, four wheels 116, an electronic control system 118, a steering system 150, a braking system 160, and the above-referenced control system 13. The body 114 is arranged on the chassis 112 and substantially encloses the other components of the vehicle 12. The body 114 and the chassis 112 may jointly form a frame. The wheels 116 are each rotationally coupled to the chassis 112 near a respective corner of the body 114.

The vehicle 12 may be any one of a number of different types of automobiles and/or other types of vehicles. For example, in certain embodiments, the vehicle 12 comprises a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 12 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor. In addition, in certain embodiments, the vehicle 12 may comprise any number of other types of vehicles, such as, by way of example only, boats, tracked vehicles, aircraft, and/or other types of vehicles. In addition, in certain embodiments one or more elements of the vehicle 12 as described herein may apply for a stationary system.

In the exemplary embodiment illustrated in FIG. 2, the vehicle 12 includes an actuator assembly 120 and a radiator 128. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator or a fuel cell system, instead of or in addition to the combustion engine.

Still referring to FIG. 2, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission.

The radiator 128 is connected to the frame at an outer portion thereof. Although not illustrated in detail, the radiator 128 includes multiple cooling channels therein that contain a cooling fluid (i.e., coolant) such as water and/or ethylene glycol (i.e., "antifreeze"), and is coupled to the engine 130.

The steering system 150 is mounted on the chassis 112, and controls steering of the wheels 116. In one embodiment, the steering system 150 includes a steering wheel and a steering column (not depicted). The steering wheel receives inputs from a driver of the vehicle. The steering column results in desired steering angles for the wheels 116 via the drive shafts 134 based on the inputs from the driver.

The braking system 160 is mounted on the chassis 112, and provides braking for the vehicle 12. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted).

The control system 13 is mounted on the chassis 112. The control system 13 provides for use of remote sensor data, in accordance with the steps for the process 400 depicted in FIGS. 4 and 5 and described further below in connection therewith. In certain embodiments, the control system 13 may comprise all or part of, and/or may be coupled to, various other vehicle devices and systems, such as, among others, the steering system 150, the actuator assembly 120, and/or the electronic control system 118. For example, in certain embodiments, the control system 13 may also control certain aspects of such systems, for example of the steering system 150 and/or the actuator assembly 120.

Figure 3:
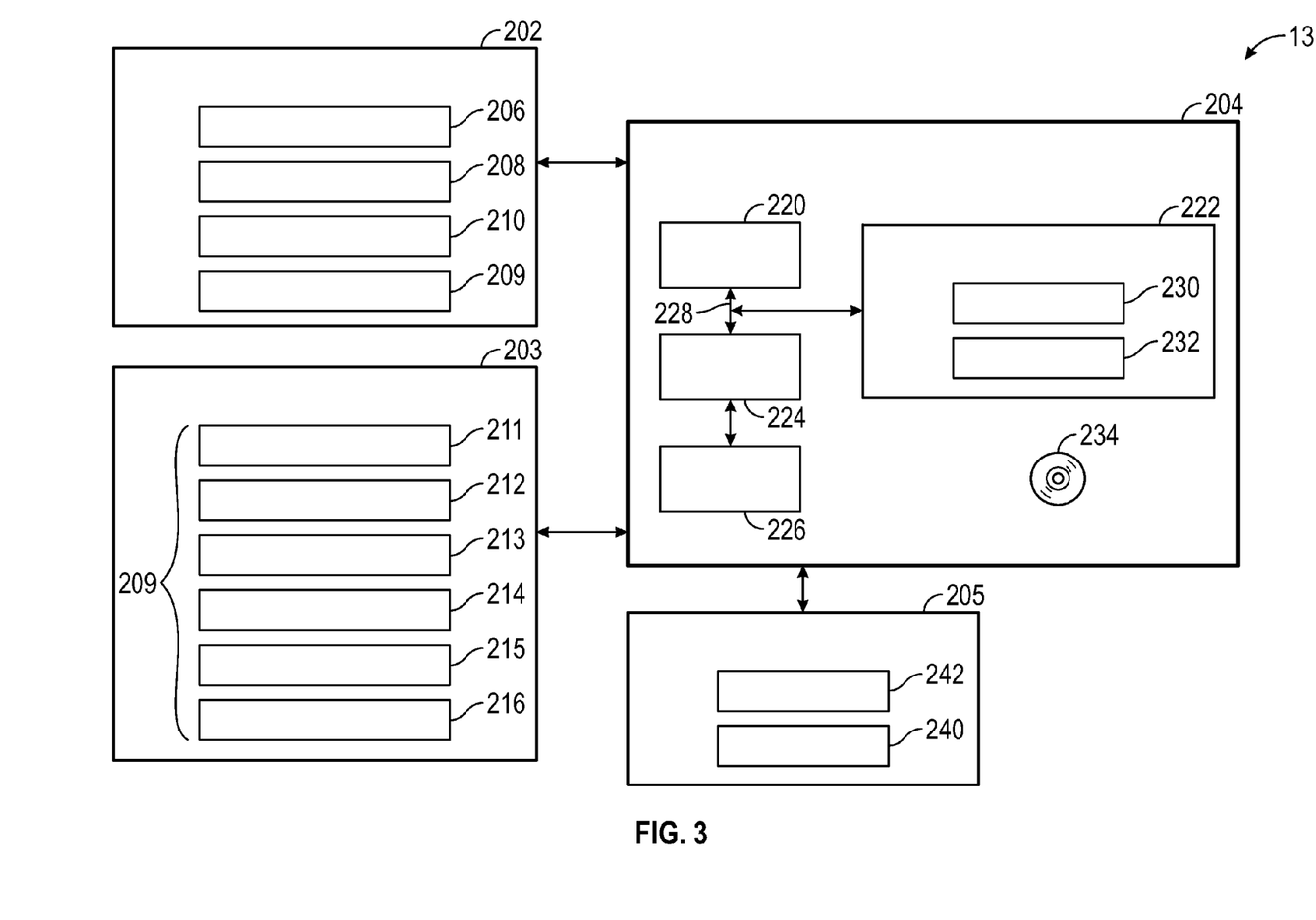
FIG. 3 is a functional block diagram of a control system that can be used in connection with the vehicle of FIGS. 1 and 2, in accordance with an exemplary embodiment.

FIG. 3 is a functional block diagram of the control system 13 of FIGS. 1 and 2, in accordance with an exemplary embodiment. As depicted in FIG. 3, the control system 13 includes a sensor array 202, a communications system 203, a controller 204, and a display 205.

The sensor array 202 measures and obtains information for use by the controller 204 for using the remote sensor data. In one embodiment, each of the sensors in the sensor array 202 are disposed within a housing onboard the vehicle 12. As depicted in FIG. 3, in one embodiment, the sensor array 202 includes one or more temperature sensors 206, humidity sensors 208, and barometric pressure sensors 210. In one embodiment, the one or more temperature sensors 206 measure an ambient temperature proximate the vehicle and/or one or more other temperature values (e.g. a temperature of an induction system of the vehicle 12) used to calculate or approximate the ambient temperature. In one embodiment, the one or more humidity sensors 208 measure a humidity proximate the vehicle and/or one or more other values used to calculate or approximate the humidity. In one embodiment, the one or more barometric pressure sensors 210 measure a barometric pressure proximate to the vehicle and/or one or more other values used to calculate or approximate the barometric pressure. The specific types and/or number of sensors in the sensor array 202 may vary in different embodiments. In certain embodiments, one or more other sensors 209 may be utilized. For example, in certain embodiments, noise data, wind speed, wind direction, or measurements of solar light load may be utilized. For example, in certain embodiments, solar light load could be used for predicting energy availability for a vehicle that has roof mounted solar panels or passenger compartment cooling requirements (e.g. for hybridized vehicles or vehicles leveraging batteries as their primary energy storage method—where vehicle controller would balance power usage over the drive route, to minimize range issues). In certain embodiments, similar adjustments could be made when there is a headwind or tailwind. In addition, in certain embodiments vehicles could adjust energy use/regenerative braking strategies to optimize for external conditions, and/or altitude data could be used to analyze road grade effects for regenerative braking algorithms.

In certain embodiments, the sensor array 202 measures various data, including engine control inputs, at locations that are part of the induction system. In the case of barometric pressure, in certain embodiments a sensor may be located inside an electronic control module, such as the electronic control system 118 of FIG. 1. In certain embodiments, humidity is measured using one or more devices, for example based on a relationship between humidity level and (1) thermal conductivity (e.g. by comparing thermistor measurements from a dry air reference and a humidified sample air stream), (2) capacitive response, and/or (3) resistive response (impedance). In various embodiments, other approaches may also be utilized.

The communications system 203 provides for communications for the vehicle 12, including communications for various sensor values for use by the controller 204 of the control system 13. As depicted in FIG. 3, in one embodiment, the communications system 203 includes a communications interface 209 that facilitates communications between the vehicle 12 and other vehicles 16 and other data sources 18 of FIG. 1 for the transmission of the various sensor values, among other data and/or information, to the vehicle 12 for use by the controller 204. In the depicted embodiment, the communications system 203 includes an antenna 211, a cellular chipset/component 212, a satellite chipset/component 213, a transceiver 214, a wireless modem 215, and a vehicle bus 216.

In one embodiment, the antenna 211 services various components of the communications interface 209, including the cellular chipset/component 212, the satellite chipset/component 213, and the transceiver 214. In one embodiment, a single antenna 211 comprises a multi-mode antenna servicing such various components. In other embodiments, multiple antennas 211 may be used.

Also in one embodiment, the cellular chipset/component 212 facilitates communications with one or more cellular networks 22 of FIG. 1 using the antenna 211, and the satellite chipset/component 213 facilitates communications with one or more satellite networks 20 of FIG. 1 using the antenna 211. The cellular chipset/component 212 and/or satellite chipset/component 213 may similarly be used to access the Internet (and/or other networks), for example using the cellular networks 22 and/or satellite networks 20. Also in one embodiment, the transceiver 214 facilitates communications with other vehicles 16 of FIG. 1 using one or more vehicle to vehicle networks 24 of FIG. 1 (for example, using radio frequencies).

In addition, in one embodiment, the wireless bus modem 215 facilitates data flow within the control system 13 (e.g., from and to the controller 204). Also in one embodiment, the vehicle bus 216 comprises a wired communication bus (e.g. a CAN bus) for communications with the controller 204 (e.g. between the sensor array 202 and the controller 204); however, this may vary in other embodiments (for example, as wireless networks may also be used).

In certain embodiments, the communications system 203 (and/or the control system 13 in general) may be part of and/or coupled to a telematics unit of the vehicle 12, for example that may be in communication with a call center and/or that may provide information and/or services such as, by way of example, turn-by-turn directions and other navigation-related services, airbag deployment notification and other emergency or roadside assistance-related services, infotainment-related services where music, Internet web pages, movies, television programs, videogames, and/or other content, and the like.

The controller 204 is coupled to the sensor array 202, the communications system 203, and the display 205. The controller 204 controls use of the remote sensor data, in accordance with the steps of the process 400 depicted in FIGS. 4 and 5 and described below in connection therewith.

As depicted in FIG. 3, the controller 204 comprises a computer system. In certain embodiments, the controller 204 may also include one or more of the sensors of the sensor array 202 and/or one or more components of the communications system 203 and/or the display 205, among other possible vehicle components. In addition, it will be appreciated that the controller 204 may otherwise differ from the embodiment depicted in FIG. 3. For example, the controller 204 may be coupled to or may otherwise utilize one or more remote computer systems and/or other control systems.

In the depicted embodiment, the computer system of the controller 204 includes a processor 220, a memory 222, an interface 224, a storage device 226, and a bus 228. The processor 220 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 220 executes one or more programs 230 contained within the memory 222 and, as such, controls the general operation of the controller 204 and the computer system of the controller 204, preferably in executing the steps of the processes described herein, such as the steps of the process 400 (and any sub-processes thereof) in connection with FIGS. 4 and 5.

The memory 222 can be any type of suitable memory. In various embodiments, this may include the various types of dynamic random access memory (DRAM) such as SDRAM, the various types of static RAM (SRAM), and the various types of non-volatile memory (PROM, EPROM, and flash). In certain examples, the memory 222 is located on and/or co-located on the same computer chip as the processor 220. In the depicted embodiment, the memory 222 stores the above-referenced program 230 along with one or more stored values 232 (e.g., threshold values) for use in implementing the measurements from the sensor array 202.

The bus 228 serves to transmit programs, data, status and other information or signals between the various components of the computer system of the controller 204. The interface 224 allows communication to the computer system of the controller 204, for example from a system driver and/or another computer system, and can be implemented using any suitable method and apparatus. It can include one or more network interfaces to communicate with other systems or components. The interface 224 may also include one or more network interfaces to communicate with technicians, and/or one or more storage interfaces to connect to storage apparatuses, such as the storage device 226.

The storage device 226 can be any suitable type of storage apparatus, including direct access storage devices such as hard disk drives, flash systems, floppy disk drives and optical disk drives. In one exemplary embodiment, the storage device 226 comprises a program product from which memory 222 can receive a program 230 that executes one or more embodiments of one or more processes of the present disclosure, such as the steps of the process 400 (and any sub-processes thereof) of FIGS. 4 and 5, described further below. In another exemplary embodiment, the program product may be directly stored in and/or otherwise accessed by the memory 222 and/or a disk (e.g., disk 234), such as that referenced below.

The bus 228 can be any suitable physical or logical means of connecting computer systems and components. This includes, but is not limited to, direct hard-wired connections, fiber optics, infrared and wireless bus technologies. During operation, the program 230 is stored in the memory 222 and executed by the processor 220.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 220) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage may also be utilized. It will similarly be appreciated that the computer system of the controller 204 may also otherwise differ from the embodiment depicted in FIG. 3, for example in that the computer system of the controller 204 may be coupled to or may otherwise utilize one or more remote computer systems and/or other control systems.

As depicted in FIG. 3, the display 205 is coupled to the controller 204. In one embodiment, the display 205 displays remote sensor values as obtained via the communication system 203 from remote sources that are remote from the vehicle 12, based on instructions provided by the controller 204 (and, specifically, by the processor 220 thereof). In one embodiment, the display 205 comprises a visual component 240 on the dash board of the vehicle 12 that automatically displays parameter values pertaining to the remote sensor values based on the instructions provided by the processor 220. In one embodiment, the displayed parameter values include an ambient temperature. Also in certain embodiments, the displayed values include barometric pressure, ambient temperature, humidity, and/or other parameter values, such as those pertaining to environmental conditions surrounding the vehicle 12. In addition, in certain embodiments, such values may be provided to the driver of the vehicle 12 via an audio component 242 (e.g., via a verbal statement of the temperature, and so on).

Figure 4:
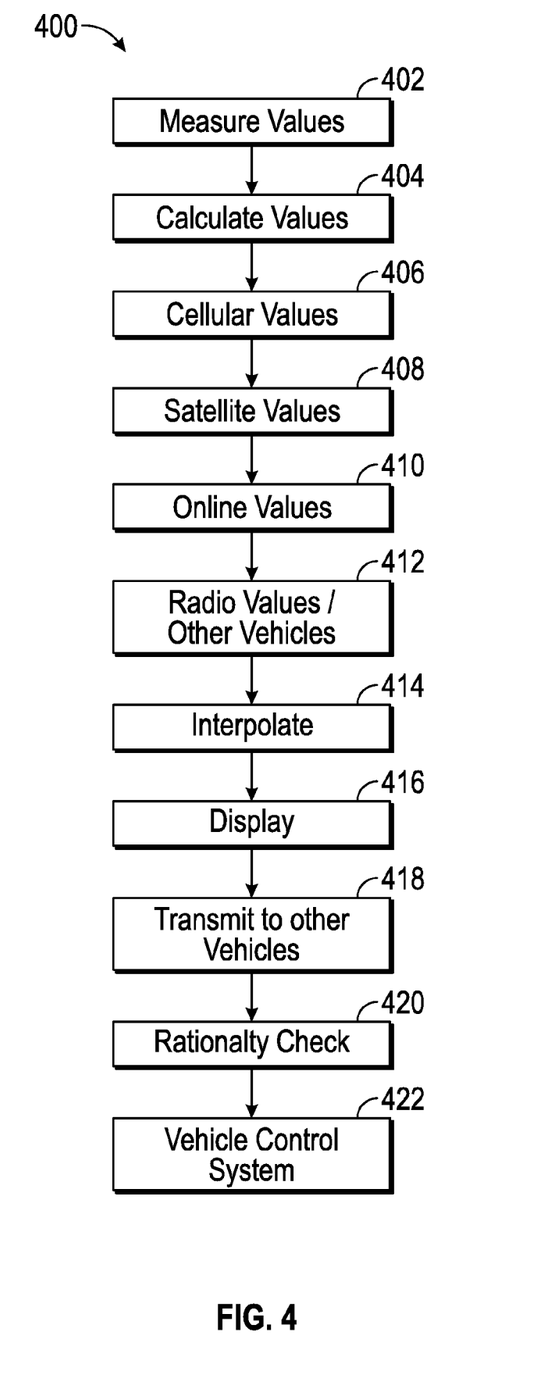
FIG. 4 is a flowchart of a process for utilizing remote sensor data, and that can be used in connection with the system of FIG. 1, the vehicle of FIGS. 1 and 2, and the control system of FIGS. 1-3, in accordance with an exemplary embodiment.

FIG. 4 is a flowchart of a process 400 for utilizing remote sensor data, in accordance with an exemplary embodiment. The process 400 can be implemented in connection with the system 10 of FIG. 1, the vehicle 12 of FIGS. 1 and 2, and the control system 13 of FIGS. 1-3, in accordance with an exemplary embodiment. The process 400 is also described herein in connection with FIG. 5 which, as described further below, depicts a flowchart for a sub-process of FIG. 4, namely, of performing a rationality check on sensor data. In one embodiment, the various steps of the process 400 are performed continuously throughout an ignition cycle or vehicle drive for the vehicle 12.

As depicted in FIG. 4, the process 400 includes measuring parameter values via sensors onboard the vehicle (step 402). In one embodiment, the values obtained in step 402 (also referred to herein as "vehicle sensor values") include ambient temperature values, barometric pressure values, and humidity values for the environment proximate the vehicle 12 of FIG. 1. In certain embodiments, other parameter values may be measured in step 402. In certain embodiments, the vehicle sensor values (e.g., ambient temperature, humidity, and barometric pressure) are measured directly by respective sensors of the sensor array 202 of FIG. 3 (e.g., ambient temperature measured by an ambient temperature sensor 206 onboard the vehicle 12, humidity measured by a humidity sensor 208 onboard the vehicle 12, and barometric pressure measured by a barometric pressure sensor 210 onboard the vehicle 12). Also in one embodiment, these values are received by the processor 220 of FIG. 3 via the communications interface 209 of FIG. 3, for example via a vehicle bus 216.

In certain other embodiments, the vehicle sensor values are calculated and/or estimated in step 404, based on related values measured in step 402. In one example, an ambient temperature value is calculated as a vehicle sensor value in step 404 based on an air induction system value measured in step 402. In one embodiment, the calculations and/or estimations of step 404 are performed by the processor 220 of FIG. 3.

Various remote sensor values are obtained in steps 406-412. Specifically, in one embodiment, various sensor values of parameters for an environment pertaining to the vehicle are obtained via wireless communications between the vehicle 12 and one or more sources of such remote sensor values that are disposed remote of the vehicle 12, using the communications interface 209 of FIG. 3 and the wireless networks 14, 20, 22, and 24 of FIG. 1. Also in one embodiment, the remote sensor values of steps 406-412 correspond to the same parameters of the vehicle sensor values of steps 402 and/or 404 (e.g. ambient temperature, humidity, and barometric pressure). In various embodiments, the remote sensor values are obtained from sources such as the other vehicles 16 and/or other data sources 18 (e.g., a national weather service 28 and/or local weather stations 30) of FIG. 1 via one or more of the following types of wireless communications: (i) cellular communications, in step 406 (e.g., using the cellular chipset/component 212 of FIG. 3 and the cellular network 22 of FIG. 1); (ii) satellite communications, in step 408 (e.g. using the satellite chipset/component 213 and the satellite network 20 of FIG. 1); (iii) Internet access, in step 410 (e.g., using the cellular network 22 and/or the satellite network 20 of FIG. 1); and (iv) vehicle to vehicle communications, in step 412 (e.g., using the transceiver 214 of FIG. 3 and the vehicle to vehicle network 24 of FIG. 1, e.g., using a radio frequency). Also in one embodiment, the remote sensor values of steps 406-412 are provided to the processor 220 of FIG. 2, for example via the wireless modem 215 of FIG. 3. In certain embodiments, the remote sensor values are from stationary sensors. As used throughout this Application, "stationary sensors" are sensors that are stationary (non-moving) and that are not disposed onboard the vehicle.

In certain embodiments, the remote sensor values of steps 406-412 are interpolated (step 414). In one such embodiment, remote sensor values are obtained via the communications interface 209 of FIG. 3 from multiple remote sources that are remote from the vehicle (e.g., multiple weather stations 30 of FIG. 1), which each of the multiple remote sources having a respective distance from the vehicle. Also in one embodiment, the interpolated values are generated by interpolating the remote sensor values of steps 406-412 utilizing the respective distances of the multiple remote sources from the vehicle 12. In one embodiment, the interpolation is performed by the processor 220 of FIG. 3, and the interpolated values thereafter may be considered as being the remote sensor values for the purposes of vehicle control and display.

The remote sensor values are displayed onboard the vehicle (step 416). In one embodiment, the remote sensor values of steps 406-414 are automatically displayed on a visual dashboard display 240 of FIG. 3 for the driver of the vehicle based on instructions provided by the processor 220 of FIG. 3. In one embodiment, an ambient temperature value is continuously, automatically displayed on a front dashboard display in this manner throughout the current ignition cycle or vehicle drive of the vehicle 12. In certain embodiments, barometric pressure, humidity, and/or other values may similarly be displayed. In certain embodiments, the values directly obtained via steps 406-412 are automatically displayed in this manner. In other embodiments in which interpolation is necessary, the interpolated values of step 414 are automatically displayed in this manner. In addition, in certain embodiments, audio notifications may also be provided via the audio unit 242 of FIG. 3.

In certain embodiments, various sensor values are transmitted by the vehicle 12 to other vehicles (step 418). Specifically, in one embodiment, in step 418, the vehicle 12 provides the vehicle sensor values of steps 402 and/or 404 and/or the remote sensor values of steps 406-414 to other vehicles 16 of FIG. 1, so that such other vehicles 16 may similarly use these values as their respective "remote sensor values" for the purposes of implementing similar algorithms onboard such other vehicles 16. In one embodiment, such values are transmitted by the vehicle 12 to the other vehicles 16 of FIG. 1 via the transceiver 214 of FIG. 3 and the vehicle to vehicle network 24 of FIG. 1.

In addition, in certain embodiments, the remote sensor values of steps 406-414 are used to perform a rationality check on the measured and/or calculated vehicle sensor values of steps 402 and/or 404 and/or the sensors from which these values were obtained or derived (step 420). In certain embodiments, the vehicle sensor values of steps 402 and/or 404 may be averaged with respective remote sensor values (e.g., based at least in part on the rationality check, in one embodiment). In addition, in certain embodiments, a notification may be provided for the driver based on the rationality check, and/or the vehicle sensor values may be ignored, removed, and/or replaced based on the rationality check (e.g., if an error is detected in one of the onboard vehicle sensors based on the rationality check).

Figure 5:
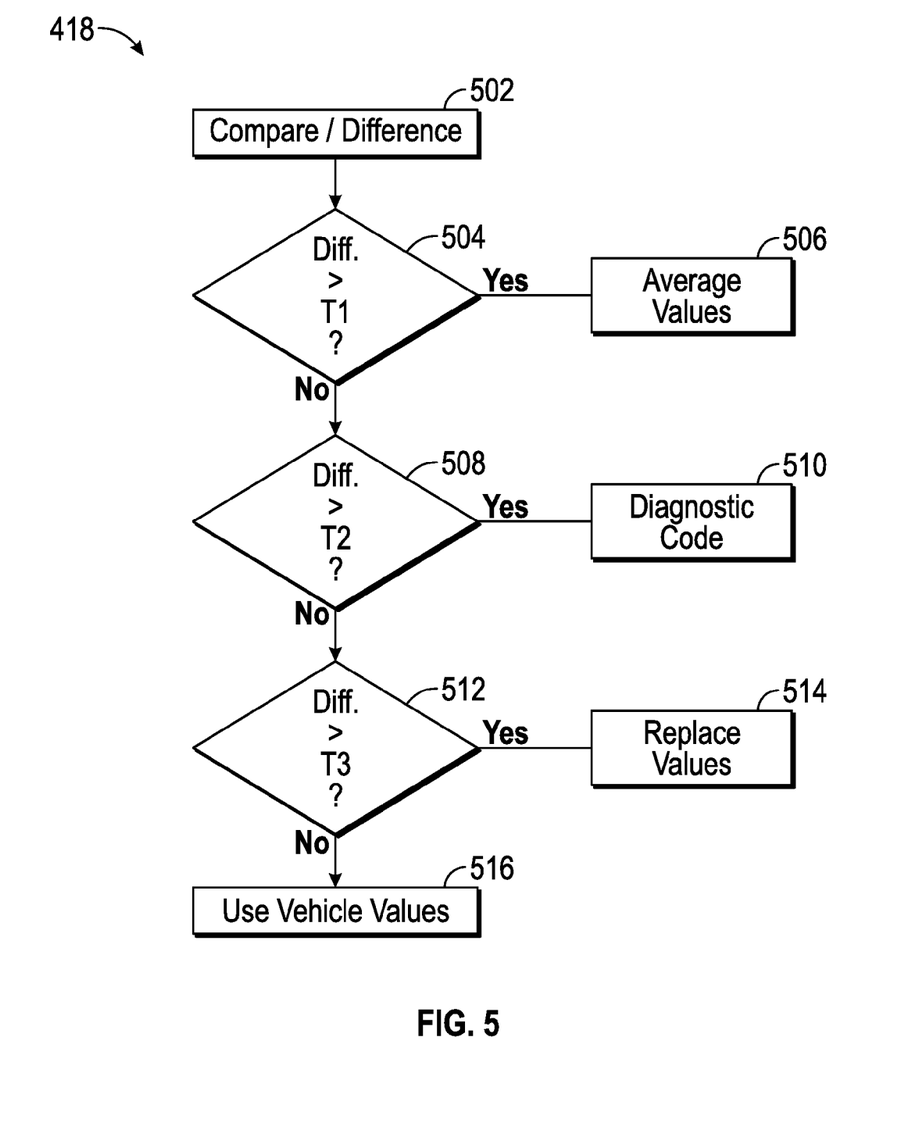
FIG. 5 is a flowchart of a sub-process of the process of FIG. 4, namely, the sub-process of conducting a rationality check for sensor values, in accordance with an exemplary embodiment

With reference to FIG. 5, a flowchart is provided in accordance with one exemplary embodiment of step 420 of the process 400 of FIG. 4, namely, performing the rationality check. In one embodiment, in step 502 a comparison is made between the respective sensor values of steps 406-414 with corresponding vehicle sensor values of steps 402 and 404 (e.g., by comparing remote sensor ambient temperature values obtained in steps 406-412 or interpolated in step 414 with vehicle sensor ambient temperature values measured in step 402 and/or calculated in step 404), thereby generating a difference between such corresponding values. In one embodiment, step 502 is performed by the processor 220 of FIG. 2.

In step 504 a determination is made as to whether the difference of step 502 is greater than a first predetermined threshold (e.g., stored in the memory 222 of FIG. 2 as one of the stored values 232 therein). In one embodiment, this determination is made by the processor 220 of FIG. 2. If a determination is made that the difference is greater than the first predetermined threshold, then, in step 406, an average value between one or more corresponding vehicle sensor values and one or more corresponding remote sensor values (e.g., an arithmetic mean) is calculated and used for vehicle control and display (e.g., via instructions provided by the processor 220 of FIG. 2). Also in certain embodiments, similar to the discussion above, values from one or more other sources may be utilized instead of or in addition to the sensor values from the sensors onboard the vehicle. For example, in certain such embodiments, values may be used from stationary sensors or an average or interpolation from multiple stationary sensors. Also in certain embodiments, data from surrounding vehicles could also be used or averaged as an alternative.

Conversely, if it is determined that the difference of step 502 is less than or equal to the first predetermined threshold, then a determination is made in step 508 as to whether the difference of step 502 is greater than a second predetermined threshold (e.g., also stored in the memory 222 of FIG. 2 as one of the stored values 232 therein). In one embodiment, the second predetermined threshold of step 508 is greater than the first predetermined threshold of step 504. Also in one embodiment, this determination is made by the processor 220 of FIG. 2. If a determination is made that the difference is greater than the second predetermined threshold, then a notification is provided for the driver in step 510, for example via a diagnostic code on the visual display 240 of FIG. 3 and/or a verbal notification via the audio unit 242 of FIG. 3, based on instructions provided by the processor 220 of FIG. 3. In addition, in certain embodiments, one or more other actions also may be provided, such as one or more of the following: (i) notification of a data error; (ii) replacement of vehicle sensor data with (and/or interpolation with) stationary data (e.g. from stationary sensors that are not disposed onboard the vehicle); (iii) replacement of vehicle sensor data with (and/or interpolation with) data from another vehicle; (iv) replacement of vehicle sensor data with averaged data from multiple other vehicles; (v) replacement of vehicle sensor data weather service data, for example taking into account position specific data for the vehicle's location; and/or (vi) recalibrating the vehicle sensor(s) and/or applying a correction factor for differences (e.g. relatively small differences) that may indicate that the respective sensor(s) may have drifted but are still responding. In certain embodiments, one or more such actions may also be taken in the above-described step 406, and/or in steps 514, 422, discussed below.

Also in one embodiment, if it is determined that the difference of step 502 is less than or equal to the second predetermined threshold, then a determination is made in step 512 as to whether the difference of step 502 is greater than a third predetermined threshold (e.g., also stored in the memory 222 of FIG. 2 as one of the stored values 232 therein). In one embodiment, the third predetermined threshold of step 512 is greater than the second predetermined threshold of step 508. Also in one embodiment, this determination is made by the processor 220 of FIG. 2. If a determination is made that the difference is greater than the third predetermined threshold, then appropriate action is taken in step 514 to ignore or remove the corresponding vehicle sensor values of steps 402 and/or 404 for purposes of vehicle control and/or to replace these values with corresponding remote sensor values of steps 406-414 and/or with other appropriate parameter values for purposes of vehicle control. In one embodiment, this is performed by the processor 220 of FIG. 3. Also in certain embodiments, similar to the discussion above, values from one or more other sources may be utilized instead of or in addition to the sensor values from the sensors onboard the vehicle. For example, in certain such embodiments, values may be used from stationary sensors, or an average or interpolation from multiple stationary sensors. Also in certain embodiments, data from surrounding vehicles could also be used or average as an alternative.

Returning to FIG. 4, in one embodiment the remote sensor values are used in a vehicle control system (step 422). In various embodiments, the remote sensor values of steps 406-414 are automatically incorporated into a vehicle control system. In one such embodiment, the remote sensor values of steps 406-414 are automatically incorporated into an engine control system for controlling one or more functions of the engine 130 of FIG. 2. In certain embodiments, averaged values from the vehicle sensor values and the remote sensor values (e.g. by taking an arithmetic means between a vehicle ambient temperature value of steps 402 and/or 404 and a corresponding remote ambient temperature value of steps 406-414) are automatically used to control the vehicle functions. In certain embodiments, more complex approximations could be accomplished with a higher order, non-linear position-based curve-fit of stationary sensor data, such as by mathematically approximating position specific data for the vehicle by applying a non-linear curve fit to existing sensor values from sensors onboard the vehicle. Also in certain embodiments, similar to the discussion above, values from one or more other sources may be utilized instead of or in addition to the sensor values from the sensors onboard the vehicle. For example, in certain such embodiments, values may be used from stationary sensor data, or an average or interpolation from multiple stationary sensors. Also in certain embodiments, data from surrounding vehicles could also be used or averaged as an alternative.

In certain other embodiments, the rationality check of step 420 (e.g., as described above in connection with FIG. 5) is used to determine if, and how, the vehicle sensor values of steps 402 and 404 and the remote sensor values of steps 406-414 are used to control the vehicle functions of step 422. For example, similar to the discussion above, in one embodiment average values between the remote sensor values and the corresponding vehicle sensor values may be used if there is a sufficient enough difference between them. By way of further example, also similar to the discussion above, in one embodiment the vehicle sensor values of steps 402 and/or 404 may be ignored and/or replaced by corresponding remote sensor values of steps 406-414 if an error is detected with the vehicle sensor values and/or the underlying onboard vehicle sensors. Also in certain embodiments, similar to the discussion above, values from one or more other sources may be utilized instead of or in addition to the sensor values from the sensors onboard the vehicle. For example, in certain such embodiments, values may be used from stationary sensor data, or an average or interpolation from multiple stationary sensor data. Also in certain embodiments, data from surrounding vehicles could also be used or averaged as an alternative.

Accordingly, methods and systems are provided for using remote sensor data for a vehicle. As discussed above, the provided methods and systems allow for potentially improved parameter values, for example that can be continuously provided during an ignition cycle or vehicle drive. The obtained remote sensor values can be used for display for the driver on a dashboard display as well as be used for performing rationality checks on corresponding vehicle sensor values and as part of a vehicle control system for controlling functions of the vehicle 12.

It will be appreciated that the system 10 of FIG. 1 and/or the vehicle 12 and/or control system 13 of FIGS. 1-3, and/or components thereof, may vary in different embodiments. It will also be appreciated that various steps of the process 400 and any sub-processes described herein in connection with FIGS. 4 and 5 may vary in certain embodiments. It will similarly be appreciated that various steps of the process 400 and any sub-processes described herein in connection with FIGS. 4 and 5 may occur simultaneous with one another, and/or in a different order as presented in FIGS. 4 and 5 and/or as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

I claim:

1. A method comprising:
automatically obtaining, via an interface onboard a vehicle, one or more remote sensor values via a wireless network from a remote source that is remote from the vehicle;
obtaining one or more vehicle sensor values from one or more sensors that are disposed onboard the vehicle;
comparing the one or more remote sensor values with the one or more vehicle sensor values, generating a comparison between the one or more remote sensor values and the one or more vehicle sensor values; and
controlling, via a processor, one or more functions of the vehicle using the comparison between the one or more remote sensor values and the one or more vehicle sensor values.

2. The method of claim 1, wherein the vehicle includes a front dash having a front dash display, and the step of controlling the one or more functions comprises automatically providing the one or more remote sensor values on the front dash display.

3. The method of claim 1, wherein the vehicle includes an engine and an engine control system, and the step of controlling the one or more functions comprises using the comparison between the one or more remote sensor values and the one or more vehicle sensor values in the engine control system for controlling one or more functions of the engine.

4. The method of claim 1, wherein the one or more remote sensor values are selected from the group consisting of: one or more temperature values, one or more barometric pressure values, and one or more humidity values from the remote source.

5. The method of claim 1, wherein:
the step of comparing the one or more remote sensor values with the one or more vehicle sensor values comprises calculating a difference between the one or more remote server values and the one or more vehicle sensor values; and
the method further comprises providing a notification if the difference is greater than a predetermined threshold.

6. The method of claim 1, wherein:
the step of comparing the one or more remote sensor values with the one or more vehicle sensor values comprises calculating a difference between the one or more remote server values and the one or more vehicle sensor values; and
the step of controlling the one or more functions of the vehicle comprises controlling, via the processor, the one or more functions of the vehicle using an average of the one or more remote sensor values and the one or more vehicle sensor values, if the difference is greater than a predetermined threshold.

7. The method of claim 1, wherein:
the step of comparing the one or more remote sensor values with the one or more vehicle sensor values comprises calculating a difference between the one or more remote server values and the one or more vehicle sensor values; and
the step of controlling the one or more functions of the vehicle comprises controlling, via the processor, the one or more functions of the vehicle using the remote sensor values and not the vehicle sensor values, if the difference is greater than a predetermined threshold.

8. The method of claim 1, wherein:
the step of comparing the one or more remote sensor values with the one or more vehicle sensor values comprises calculating a difference between the one or more remote server values and the one or more vehicle sensor values; and
the step of controlling the one or more functions of the vehicle comprises controlling, via the processor, the one or more functions of the vehicle:
using an average of the one or more remote sensor values and the one or more vehicle sensor values, if the difference is greater than a first predetermined threshold; and
using the remote sensor values and not the vehicle sensor values, if the difference is greater than a second predetermined threshold.

9. A system comprising:
an interface disposed onboard a vehicle, the vehicle including a front dash having a front dash display, the interface configured to automatically obtain one or more remote sensor values via a wireless network from a remote source that is remote from the vehicle; and
a processor coupled to the interface, the processor configured to automatically provide the one or more remote sensor values on the front dash display of the vehicle; wherein:
the interface is configured to obtain one or more vehicle sensor values from one or more sensors onboard the vehicle; and
the processor is configured to conduct a rationality check for the one or more vehicle sensor values using the one or more remote sensor values.

10. The system of claim 9, wherein:
the vehicle includes an engine and an engine control system; and
the processor is configured to use the one or more remote sensor values in the engine control system for controlling one or more functions of the engine.

11. The system of claim 9, wherein the one or more remote sensor values are selected from the group consisting of: one or more temperature values, one or more barometric pressure values, and one or more humidity values from the remote source.

12. The system of claim 9, wherein the interface is configured to obtain the one or more remote sensor values from a weather station via the wireless network.

13. The system of claim 9, wherein the interface is configured to obtain the one or more remote sensor values from one or more additional vehicles via the wireless network.

14. The system of claim 9, wherein:
the interface is configured to obtain the remote sensor values from multiple remote sources that are remote from the vehicle, the multiple remote sources each having a respective distance from the vehicle; and
the processor is configured to:
generate one or more interpolated values by interpolating the remote sensor values utilizing the respective distances of the multiple remote sources from the vehicle; and
automatically controlling one or more functions for operation of the vehicle using the one or more interpolated values.

15. The system of claim 9, wherein the processor is configured to provide a notification if an error is detected for the one or more sensors onboard the vehicle based on the rationality check.

16. The system of claim 9, wherein the processor is further configured to mathematically approximate position specific data by applying a non-linear curve fit to existing sensor values from sensors onboard the vehicle.

17. The system of claim 9, wherein the processor utilizes stationary sensor values to evaluate ambient temperature conditions for a vehicle.

18. A system comprising:
an interface disposed onboard a vehicle, the interface configured to automatically obtain remote sensor values via a wireless network from multiple remote sources that are remote from the vehicle, the multiple remote sources each having a respective distance from the vehicle; and
a processor coupled to the interface, the processor configured to:
generate one or more interpolated values by interpolating the remote sensor values utilizing the respective distances of the multiple remote sources from the vehicle; and
automatically control one or more functions for operation of the vehicle using the one or more interpolated values.

19. The system of claim 18, wherein:
the vehicle includes an engine control system; and
the processor is configured to control operation of the engine control system based at least in part on the one or more interpolated values.

* * * * *